US009811279B2

(12) United States Patent
Kurian et al.

(10) Patent No.: US 9,811,279 B2
(45) Date of Patent: Nov. 7, 2017

(54) SECURING PHYSICAL-STORAGE-MEDIA DATA TRANSFERS (71) Applicant: Bank of America Corporation, Charlotte, NC (US)

(72) Inventors: Manu Kurian, Dallas, TX (US); Sorin N. Cismas, Southlake, TX (US)

(73) Assignee: Bank of America Corporation, Charlotte, NC (US)

( * ) Notice: Subject to any disclaimer, the term of this patent is extended or adjusted under 35 U.S.C. 154(b) by 204 days.

(21) Appl. No.: 14/710,813

(22) Filed: May 13, 2015

(65) Prior Publication Data
US 2016/0335016 A1 Nov. 17, 2016

(51) Int. Cl.
*G06F 12/02* (2006.01)
*G06F 3/06* (2006.01)

(52) U.S. Cl.
CPC .......... *G06F 3/0623* (2013.01); *G06F 3/0629* (2013.01); *G06F 3/0683* (2013.01)

(58) Field of Classification Search
None
See application file for complete search history.

(56) References Cited

U.S. PATENT DOCUMENTS

| 6,085,321 | A | 7/2000 | Gibbs et al. |
| 6,357,006 | B1 | 3/2002 | Pham et al. |
| 6,795,919 | B1 | 9/2004 | Gibbs et al. |
| 6,874,092 | B1 * | 3/2005 | Motoyama .............. G06F 21/80 707/999.202 |
| 7,373,520 | B1 | 5/2008 | Borthakur et al. |
| 7,457,952 | B2 | 11/2008 | Rogriguez et al. |
| 7,523,315 | B2 | 4/2009 | Hougaard et al. |
| 7,694,126 | B2 | 4/2010 | Miyazaki et al. |
| 7,756,926 | B2 | 7/2010 | Tseng et al. |
| 8,122,255 | B2 | 2/2012 | Merrill |
| 8,224,851 | B2 | 7/2012 | Banda et al. |
| 8,656,173 | B2 | 2/2014 | Yoshioka et al. |
| 8,826,026 | B2 | 9/2014 | Mergen et al. |
| 2006/0236053 | A1 * | 10/2006 | Shiga .................. G06F 21/6218 711/163 |

(Continued)

*Primary Examiner* — Charles Rones
*Assistant Examiner* — Ryan Dare
(74) *Attorney, Agent, or Firm* — Banner & Witcoff, Ltd.; Michael A. Springs (57) ABSTRACT

A computing system may receive physical-storage-media identifiers stored on physical storage media approved for use by an organization. The computing system may generate, for each of the physical storage media, a log entry comprising a physical-storage-media identifier, of the physical-storage-media identifiers, stored on the physical storage medium. The computing system may receive, from a computing device, a request to write secure data to a physical storage medium. Responsive to determining that the request comprises a physical-storage-media identifier that is amongst the physical-storage-media identifiers: the computing system may either instruct the computing device to write the secure data to the physical storage medium or fail to instruct the computing device to write the secure data to the physical storage medium; and may update a log entry comprising the physical-storage-media identifier to reflect whether the computing system instructed the computing device to write the secure data to the physical storage medium.

11 Claims, 5 Drawing Sheets

(56) References Cited

U.S. PATENT DOCUMENTS

| | | |
|---|---|---|
| 2009/0138517 A1 | 5/2009 | McLain et al. |
| 2009/0328218 A1* | 12/2009 | Tsurukawa ............... G06F 21/64 726/23 |
| 2010/0312810 A1 | 12/2010 | Horton et al. |
| 2013/0145112 A1* | 6/2013 | Foster ..................... G06F 12/14 711/163 |
| 2014/0297423 A1 | 10/2014 | Tseng et al. |

* cited by examiner

SECURING PHYSICAL-STORAGE-MEDIA DATA TRANSFERS

BACKGROUND

While improvements in computer networking have diminished the need for transferring computer data via physical storage media, transferring data via physical storage media continues to be preferable for certain types of data transfers. For example, certain data transfers may be too large for efficient network transfer. Additionally, data transfers may involve confidential, sensitive, or proprietary information, and transferring such data via physical storage media may prove more secure than available network-transfer alternatives. Similarly, certain types of third-party data transfers may be required to be made via physical storage media (e.g., regulatory submissions, discovery productions, and the like). Thus, while many organizations appreciate that there are data-leakage risks associated with providing users of their computing systems with the ability to transfer data via physical storage media, they also recognize that a need exists to provide at least some users of their computing systems with the ability to transfer data via physical storage media but desire to secure such physical-storage-media data transfers. Accordingly, a need exists for securing physical-storage-media data transfers.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing system may receive physical-storage-media identifiers stored on physical storage media approved for use by an organization. The computing system may generate, for each of the physical storage media, a log entry comprising a physical-storage-media identifier, of the physical-storage-media identifiers, stored on the physical storage medium. The computing system may receive, from a computing device, a request to write secure data to a physical storage medium.

Responsive to determining that the request comprises a physical-storage-media identifier that is amongst the physical-storage-media identifiers: the computing system may either instruct the computing device to write the secure data to the physical storage medium or fail to instruct the computing device to write the secure data to the physical storage medium; and may update a log entry comprising the physical-storage-media identifier to reflect whether the computing system instructed the computing device to write the secure data to the physical storage medium.

For example, in some embodiments, the computing system may receive physical-storage-media identifiers stored on physical storage media approved for use by an organization associated with the computing system. For each physical storage medium of the physical storage media approved for use by the organization, the computing system may generate, in a log stored in a memory of the computing system, an entry comprising a physical-storage-media identifier, of the physical-storage-media identifiers, stored on the physical storage medium. The computing system may receive, from a first computing device, a request to write a first portion of secure data stored in the memory of the computing system to a first physical storage medium and may receive, from a second computing device, a request to write a second portion of the secure data to a second physical storage medium. The computing system may determine that the request to write the first portion of the secure data to the first physical storage medium comprises a first physical-storage-media identifier that is amongst the physical-storage-media identifiers and may determine that the request to write the second portion of the secure data to the second physical storage medium comprises a second physical-storage-media identifier that is amongst the physical-storage-media identifiers.

Responsive to determining that the request to write the first portion of the secure data to the first physical storage medium comprises the first physical-storage-media identifier, the computing system may instruct the first computing device to write the first portion of the secure data to the first physical storage medium and may update an entry, of the log stored in the memory, comprising the first physical-storage-media identifier to reflect that the computing system instructed the first computing device to write the first portion of the secure data to the first physical storage medium. Responsive to determining that the request to write the second portion of the secure data to the second physical storage medium comprises the second physical-storage-media identifier, the computing system may fail to instruct the second computing device to write the second portion of the secure data to the second physical storage medium and may update an entry, of the log stored in the memory, comprising the second physical-storage-media identifier to reflect that the computing system failed to instruct the second computing device to write the second portion of the secure data to the second physical storage medium.

In some embodiments, the computing system may determine, based on the second physical-storage-media identifier, that the second physical storage medium has been tampered with and may fail to instruct the second computing device to write the second portion of the secure data to the second physical storage medium in response to determining that the second physical storage medium has been tampered with. For example, in some embodiments, generating the entry comprising the physical-storage-media identifier may comprise generating an entry comprising one or more properties of the physical storage medium (e.g., a number of times the physical storage medium has been written to, an available amount of storage on the physical storage medium, a total storage capacity of the physical storage medium, a manufacture of the physical storage medium, a number of times that the physical-storage-media identifier has been read from the physical storage medium, or the like), and the request to write the second portion of secure data stored in the memory to the second physical storage medium may comprise one or more properties of the second physical storage medium (e.g., a number of times the second physical storage medium has been written to, an available amount of storage on the second physical storage medium, a total storage capacity of the second physical storage medium, a manufacture of the second physical storage medium, a number of times that the second physical-storage-media identifier has been read from the second physical storage medium, or the like). In such embodiments, the computing system may determine that the second physical storage medium has been tampered with by identifying, in the log stored in the memory, an entry comprising the second physical-storage-media identifier and determining that the entry comprises one or more properties that are different from the one or more properties of the second physical storage medium. Additionally or alternatively, the computing system may determine that a portion of the secure data has previously been written to a different physical storage medium comprising the second physical-storage-media identifier.

In some embodiments, responsive to determining that the request to write the second portion of the secure data stored in the memory to the second physical storage medium comprises the second physical-storage-media identifier, the computing system may generate, based on the entry comprising the second physical-storage-media identifier, a message indicating that that the computing system failed to instruct the second computing device to write the second portion of the secure data to the second physical storage medium and may communicate the message to a computing device associated with a physical-storage-media administrator of the organization.

In some embodiments, the computing system may write, to each physical storage medium of the physical storage media approved for use by the organization, a different physical-storage-media identifier of the physical-storage-media identifiers. For example, in some embodiments, the physical storage media approved for use by the organization may include optical media, and the computing system may write, for each optical medium of the optical media, a different physical-storage-media identifier of the physical-storage-media identifiers to the optical medium. In some embodiments, each of the optical media may include a portion reserved for physical-storage-media identifiers associated with the physical storage media approved for use by the organization, and the computing system may write the different physical-storage-media identifier to the portion of the optical medium reserved for physical-storage-media identifiers associated with the physical storage media approved for use by the organization. In some embodiments, the computing system may write the physical-storage-media identifier to the optical medium, during a first optical-media-writing session for the optical medium. In such embodiments, responsive to the computing system instructing a computing device to write a portion of the secure data to the optical medium, the computing device may write the portion of the secure data to the optical medium during a second optical-media-writing session for the optical medium.

Additionally or alternatively, the physical storage media approved for use by the organization may include solid-state-memory devices, and the computing system may write, for each solid-state-memory device of the solid-state-memory devices, a different physical-storage-media identifier of the physical-storage-media identifiers to the solid-state-memory device. In some embodiments, each of the solid-state-memory devices may include a portion (e.g., a physically and/or logically separate memory, or the like) reserved for physical-storage-media identifiers associated with the physical storage media approved for use by the organization. In such embodiments, the computing system may write the different physical-storage-media identifier to the portion of the solid-state-memory device reserved for physical-storage-media identifiers associated with the physical storage media approved for use by the organization.

In some embodiments, the computing system may configure each physical storage medium of the physical storage media approved for use by the organization to prevent the portion of the physical storage medium reserved for physical-storage-media identifiers associated with physical storage media approved for use by the organization from being displayed in a user-viewable portion of an operating system file system.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
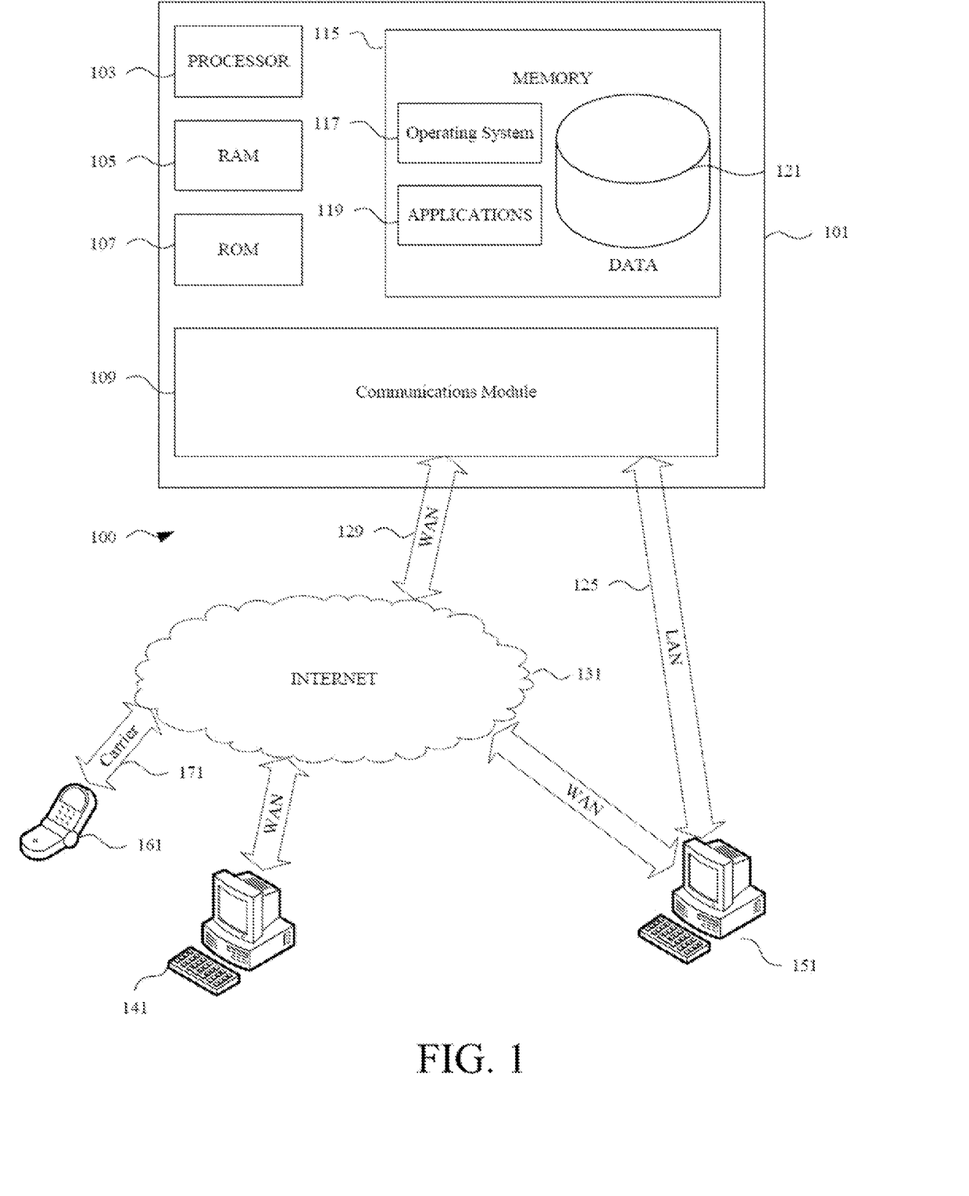
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
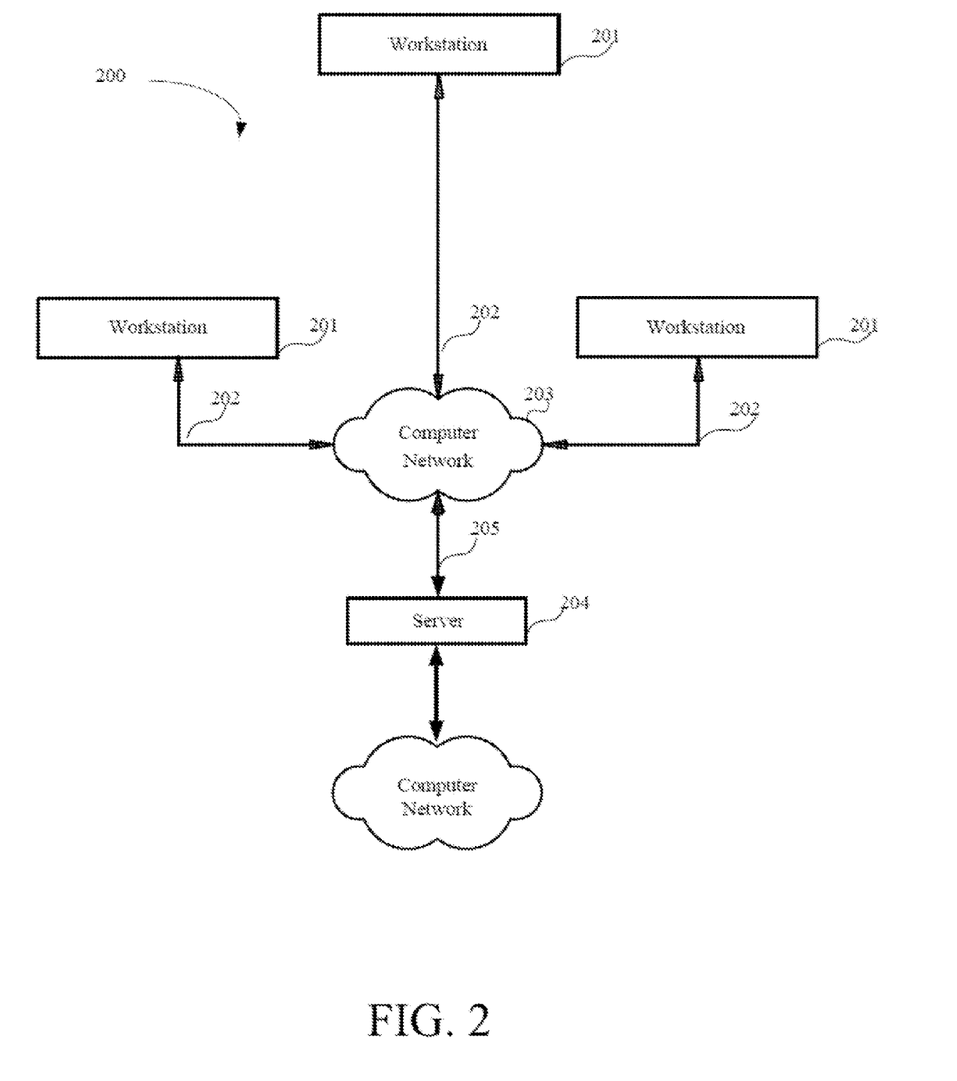
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
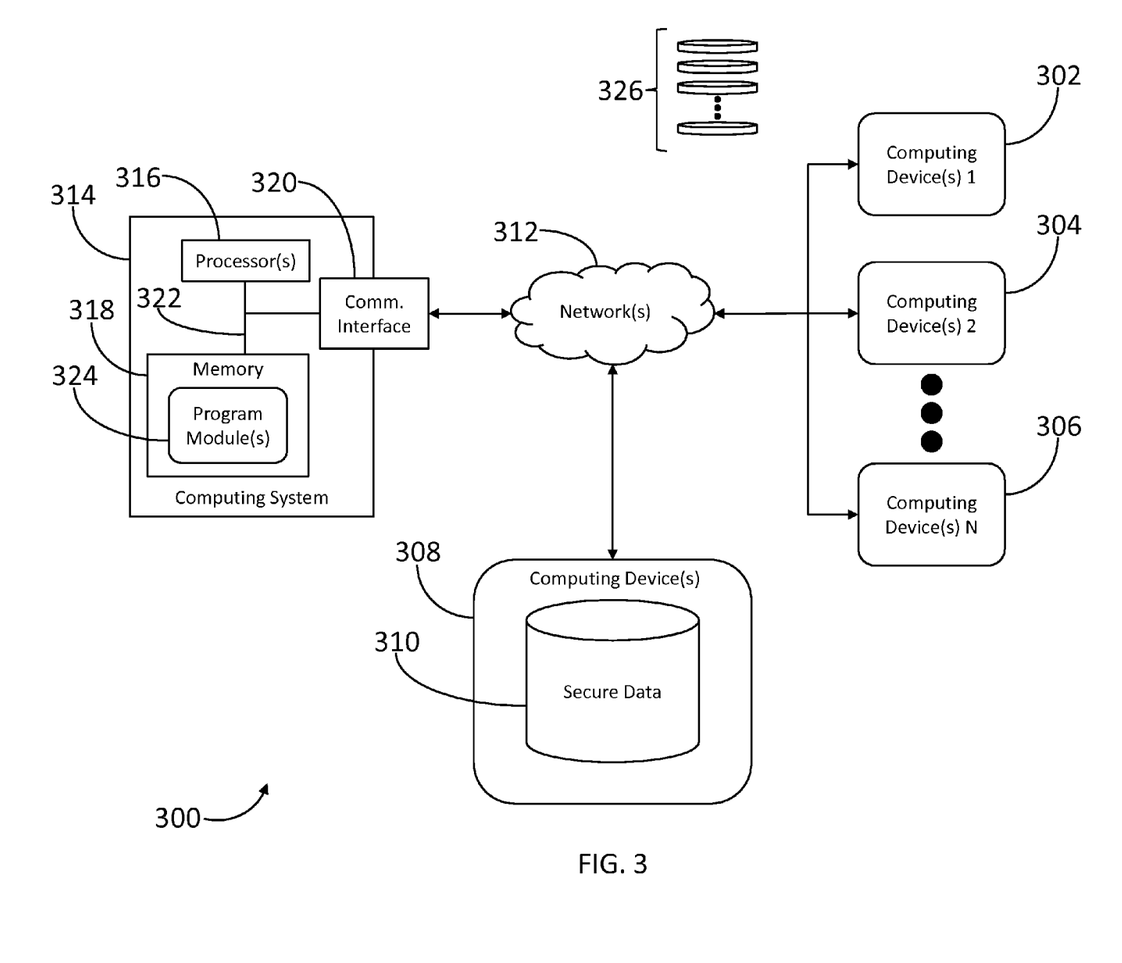
FIG. 3 depicts an illustrative computing environment for securing physical-storage-media data transfers in accordance with one or more example embodiments.

FIG. 3 depicts an illustrative computing environment for securing physical-storage-media data transfers in accordance with one or more example embodiments. Referring to FIG. 3, computing environment 300 may be associated with one or more organizations (e.g., corporations, universities, government entities, healthcare providers, financial institutions, or the like) and may include one or more computing devices. For example, computing environment 300 may include computing device(s) 302, 304, 306, and 308. Computing device(s) 302, 304, 306, and 308 may include one or more of any type of computing device (e.g., desktop computer, laptop computer, tablet computer, smart phone, server, server blade, mainframe, virtual machine, or the like) configured to perform one or more of the functions described herein. As will be described in greater detail below, one or more of computing device(s) 302, 304, 306, or 308 may store secure data associated with the organization. For example, computing device(s) 308 may store secure data 310. Computing environment 300 may also include one or more networks. For example, computing environment 300 may include network(s) 312, which may include one or more sub-networks (e.g., LANs, WANs, VPNs, or the like) and may interconnect one or more of computing device(s) 302, 304, 306, and 308.

Computing environment 300 may also include one or more computing systems. For example, computing environment 300 may include computing system 314. Computing system 314 may include one or more of any type of computing device (e.g., desktop computer, laptop computer, tablet computer, smart phone, server, server blade, mainframe, virtual machine, or the like) configured to perform one or more of the functions described herein. In some embodiments, computing system 314 may include one or more of computing device(s) 302, 304, 306, or 308. Computing system 314 may include one or more processor(s) 316, memory 318, communication interface 320, and/or data bus 322. Data bus 322 may interconnect processor(s) 316, memory 318, and/or communication interface 320. Communication interface 320 may be a network interface configured to support communications between computing system 314 and network(s) 312 (or one or more sub-networks thereof) (e.g., communications between computing system 314 and one or more of computing device(s) 302, 304, 306, or 308). Memory 318 may include one or more program modules comprising instructions that when executed by processor(s) 316 cause computing system 314 to perform one or more functions described herein. For example, memory 318 may include program module(s) 324, which may comprise instructions that when executed by processor(s) 316 cause computing system 314 to perform one or more functions described herein. As will be described in further detail below, computing environment 300 may further include one or more physical storage media 326. Physical storage media 326 may include one or more physically distinct media for storing computer data. Physical storage media 326 may include computer-data-storage media intended for repetitive or long-term use by a particular one of computing device(s) 302, 304, or 306 (e.g., fixed media, such as an integrated disk drive (e.g., a "hard" drive, one or more reusable disks or platters, solid-state-memory devices, or the like), or similar media), as well as computer-data-storage media intended for one-time or periodic short-term use by one or more of computing device(s) 302, 304, or 306 (e.g., removable media, such as diskettes (e.g., "floppy" diskettes, or the like), optical media (e.g., compact disk-recordable (CD-R) disks, compact disk-rewritable (CD-RW) disks, digital versatile (or video) disk (DVD) disks, or the like), solid-state-memory devices (e.g., solid-state-memory devices equipped with a universal serial bus (USB) interface, memory or flash cards, other volatile-memory devices, or the like), removable disk drives (e.g., external or peripheral disk drives, hot-swappable disk drives, or the like), or similar media).

Figure 4:
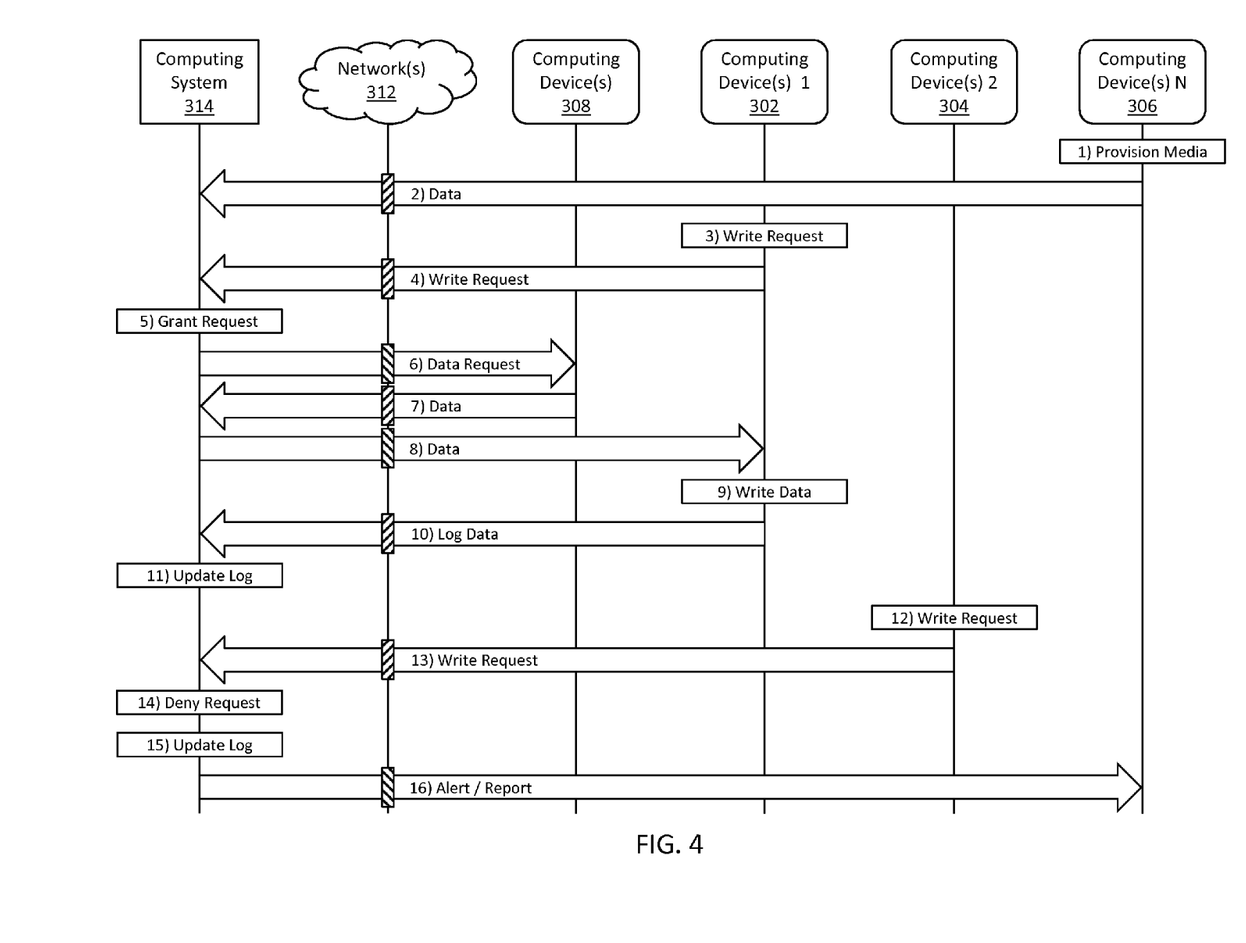
FIG. 4 depicts an illustrative event sequence for securing physical-storage-media data transfers in accordance with one or more example embodiments.

FIG. 4 depicts an illustrative event sequence for securing physical-storage-media data transfers in accordance with one or more example embodiments. Referring to FIG. 4, at step 1, computing device(s) 306 may provision physical storage media 326 with physical-storage-media identifiers. For example, computing device(s) 306 may be associated with a physical-storage-media administrator of the organization associated with computing environment 300, physical storage media 326 may comprise physical storage media approved for use by the organization, and the physical-storage-media administrator may utilize computing device(s) 306 to write a different (or unique) physical-storage-media identifier to each of physical storage media 326, each of which may store its respective physical-storage-media identifier.

In some embodiments, physical storage media 326 may include optical media, and computing device(s) 306 may write a different physical-storage-media identifier to each of the optical media. In some embodiments, each of the optical media may include a portion reserved for physical-storage-media identifiers associated with physical storage media 326 (e.g., physical storage media approved for use by the organization associated with computing environment 300), and computing device(s) 306 may write the different physical-storage-media identifier to the portion of the optical medium reserved for the physical-storage-media identifiers. In some embodiments, computing device(s) 306 may write the physical-storage-media identifier to the optical medium, during a first optical-media-writing session for the optical medium.

Additionally or alternatively, physical storage media 326 may include solid-state-memory devices, and computing device(s) 306 may write a different physical-storage-media identifier to each of the solid-state-memory devices. In some embodiments, each of the solid-state-memory devices may include a portion (e.g., a physically and/or logically separate memory, or the like) reserved for physical-storage-media identifiers associated with physical storage media 326. In such embodiments, computing device(s) 306 may write the different physical-storage-media identifier to the portion of the solid-state-memory device reserved for physical-storage-media identifiers.

In some embodiments, computing device(s) 306 may configure each physical storage medium of physical storage media 326 to prevent the portion of the physical storage medium reserved for physical-storage-media identifiers associated with physical storage media 326 from being displayed in a user-viewable portion of an operating system file system (e.g., to hide the reserved portion (or data contained therein) from view within the file system, prevent accidental access, modification, or manipulation of the reserved portion (or data contained therein), or the like).

At step 2, computing device(s) 306 may communicate (e.g., via network(s) 312, as indicated by the shaded box over the line extending downward from network(s) 312) the physical-storage-media identifiers associated with physical storage media 326 to computing system 314, which may receive (e.g., via communication interface 320) the physical-storage-media identifiers associated with physical storage media 326 and may generate, in a log stored in memory 318 an entry for each of physical storage media 326. Each entry may comprise the physical-storage-media identifier written by computing device(s) 306 to its corresponding physical storage medium. In some embodiments, computing device(s) 306 may communicate to computing system 314 one or more properties of each physical storage medium of physical storage media 326 (e.g., a number of times the physical storage medium has been written to, an available amount of storage on the physical storage medium, a total storage capacity of the physical storage medium, a manufacture of the physical storage medium, a number of times that the physical-storage-media identifier has been read from the physical storage medium, or the like), and each of the entries generated by computing system 314 may comprise the properties of its corresponding physical storage medium.

At step 3, computing device(s) 302 may generate a request to write a portion of secure data 310 to a physical storage medium. For example, secure data 310 may include data that the organization associated with computing environment 300 has identified as presenting a heightened data-leakage risk, and computing device(s) 302 and 304 may be among a limited number of computing device(s) within computing environment 300 authorized to write portions of secure data 310 to physical storage media 326; however, the authorization of computing device(s) 302 and 304 to write portions of secure data 310 to physical storage media 326 may be subject to case-by-case authorization from computing system 314. At step 4, computing device(s) 302 may communicate, to computing system 314, the request to write the portion of secure data 310 to the physical storage medium, and computing system 314 may receive (e.g., via communication interface 320) the request from computing device(s) 302. At step 5, computing system 314 may determine to grant the request received from computing device(s) 302. For example, the request to write the portion of secure data 310 to the physical storage medium may comprise a physical-storage-media identifier stored on the physical storage medium and read by computing device(s) 302 from the physical storage medium, and computing system 314 may identify, in the log stored in memory 318, an entry comprising the physical-storage-media identifier (e.g., amongst the entries generated by computing system 314, as described above with respect to step 2) and may determine to grant the request based on identifying the entry comprising the physical-storage-media identifier (e.g., based on determining that the physical-storage-media identifier is amongst the physical-storage-media identifiers associated with physical storage media 326 (e.g., physical storage media approved for use by the organization associated with computing environment 300)).

At step 6, computing system 314 may request the portion of secure data 310 from computing device(s) 308 (e.g., computing device(s) 302 and 304 may be unable to directly access secure data 310 due to their being among the limited number of computing device(s) within computing environment 300 authorized to write portions of secure data 310 to physical storage media 326), and, at step 7, computing device(s) 308 may communicate the requested portion of secure data 310 to computing system 314, which may receive (e.g., via communication interface 320) the requested portion of secure data 310 and, at step 8, may communicate, to computing device(s) 302 the requested portion of secure data 310, as well as instructions (and/or authorization) to write the requested portion of secure data 310 to the physical storage medium. At step 9, computing device(s) 302 may write the requested portion of secure data 310 to the physical storage medium. As indicated above, in some embodiments, the physical storage medium may comprise an optical medium, and computing device(s) 306 may have written the physical-storage-media identifier during a first optical-media-writing session for the optical medium. In such embodiments, computing device(s) 302 may write the requested portion of secure data 310 to the optical medium during a second optical-media-writing session for the optical medium.

At step 10, computing device(s) 302 may communicate log data (e.g., data indicating that the requested portion of secure data 310 was written to the physical storage medium and/or one or more updated properties of the physical storage medium (e.g., an updated number of times the physical storage medium has been written to, an updated amount of available storage on the physical storage medium, an updated number of times that the physical-storage-media identifier has been read from the physical storage medium, or the like)) to computing system 314, which may receive (e.g., via communication interface 320) the log data from computing device(s) 302 and, at step 11, may update the log entry comprising the physical-storage-media identifier (e.g., to reflect that computing system 314 instructed computing device(s) 302 to write the portion of secure data 310 to the physical storage medium, an updated number of times the physical storage medium has been written to, an updated amount of available storage on the physical storage medium, an updated number of times that the physical-storage-media identifier has been read from the physical storage medium, one or more associated timestamps or environment variables, or the like).

At step 12, computing device(s) 304 may generate a request to write a portion of secure data 310 to a physical storage medium. At step 13, computing device(s) 304 may communicate, to computing system 314, the request to write the portion of secure data 310 to the physical storage medium, and computing system 314 may receive (e.g., via communication interface 320) the request from computing device(s) 304. At step 14, computing system 314 may determine to deny the request received from computing device(s) 304 and may thus fail to instruct (and/or authorize) computing device(s) 304 to write the portion of secure data 310 to the physical storage medium. For example, in some embodiments, the request to write the portion of secure data 310 to the physical storage medium may comprise a physical-storage-media identifier stored on the physical storage medium and read by computing device(s) 304 from the physical storage medium, and computing system 314 may fail to identify, in the log stored in memory 318, an entry comprising the physical-storage-media identifier (e.g., amongst the entries generated by computing system 314, as described above with respect to step 2) and may determine to deny the request based on failing to identify an entry comprising the physical-storage-media identifier (e.g., based on determining that the physical-storage-media identifier is not amongst the physical-storage-media identifiers associated with physical storage media 326 (e.g., physical storage media approved for use by the organization associated with computing environment 300)).

Alternatively, computing system 314 may identify, in the log stored in memory 318, an entry comprising the physical-storage-media identifier (e.g., amongst the entries generated by computing system 314, as described above with respect to step 2) and may determine to deny the request based on identifying the entry comprising the physical-storage-media identifier (e.g., based on determining that the physical-storage-media identifier is amongst the physical-storage-media identifiers associated with physical storage media 326 (e.g., physical storage media approved for use by the organization associated with computing environment 300)). In some embodiments, computing system 314 may determine, based on the physical-storage-media identifier, that the physical storage medium has been tampered with. For example, the request received from computing device(s) 304 may comprise one or more properties of the physical storage medium determined by computing device(s) 304 (e.g., a number of times the physical storage medium has been written to, an available amount of storage on the physical storage medium, a total storage capacity of the physical storage medium, a manufacture of the physical storage medium, a number of times that the physical-storage-media identifier has been read from the physical storage medium, or the like).

As indicated above, in some embodiments, each of the entries generated by computing system 314 may comprise one or more properties of its corresponding physical storage medium (e.g., a number of times the physical storage medium has been written to, an available amount of storage on the physical storage medium, a total storage capacity of the physical storage medium, a manufacture of the physical storage medium, a number of times that the physical-storage-media identifier has been read from the physical storage medium, or the like). In such embodiments, computing system 314 may determine that the physical storage medium has been tampered with by determining that one or more of the properties of the physical storage medium included in the request received from computing device(s) 304 differs from one or more of the properties included in the entry comprising the physical-storage media identifier (e.g., that the request indicates that computing device(s) 304 determined a number of times the physical storage medium has been written to that differs from a number of times the physical storage medium has been written to indicated by the entry comprising the physical-storage-media identifier included in the request, that the request indicates that computing device(s) 304 determined an available amount of storage on the physical storage medium that differs from an available amount of storage of the physical storage medium indicated by the entry comprising the physical-storage-media identifier included in the request, that the request indicates that computing device(s) 304 determined a total storage capacity of the physical storage medium that differs from a total storage capacity of the physical storage medium indicated by the entry comprising the physical-storage-media identifier included in the request, that the request indicates that computing device(s) 304 determined a manufacture of the physical storage medium that differs from a manufacture of the physical storage medium indicated by the entry comprising the physical-storage-media identifier included in the request, that the request indicates that computing device(s) 304 determined a number of times that the physical-storage-media identifier has been read from the physical storage medium that differs from a number of times that the physical-storage-media identifier has been read from the physical storage medium indicated by the entry comprising the physical-storage-media identifier included in the request, or the like).

At step 15, computing system 314 may update the log entry comprising the physical-storage-media identifier (e.g., to reflect that computing system 314 failed to instruct computing device(s) 304 to write the portion of secure data 310 to the physical storage medium. At step 16, computing system 314 may generate (e.g., based on one or more of the log entries updated in steps 11 and 15) a message indicating whether computing system 314 instructed computing device(s) 302 and/or 304 to write the requested portions of secure data 310 to the physical storage media and may communicate the message to computing device(s) 306. For example, in some embodiments, the message may comprise a report indicating that computing system 314 instructed computing device(s) 302 to write the requested portion of secure data 310 to the physical storage medium and failed to instruct computing device(s) 304 to write the requested portion of secure data 310 to the physical storage medium. Additionally or alternatively, the message may comprise an alert generated by computing system 314 in response to the request received from computing device(s) 304 and may indicate that computing system 314 failed to instruct computing device(s) 304 to write the requested portion of secure data 310 to the physical storage medium.

Figure 5:
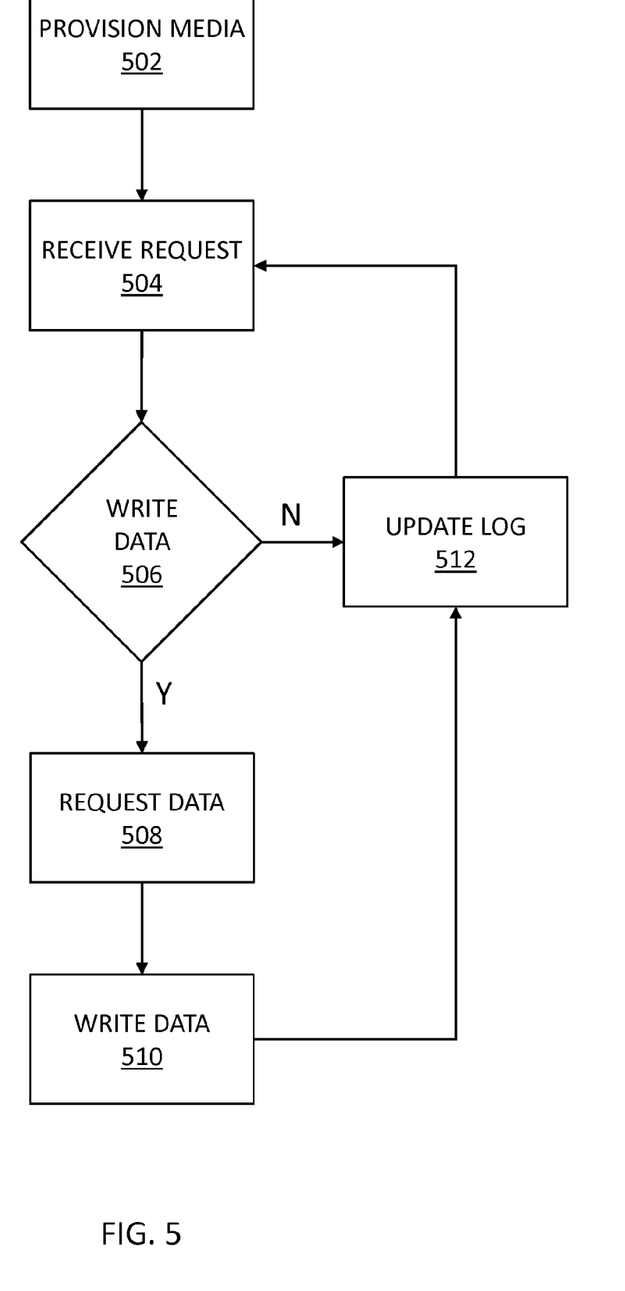
FIG. 5 depicts an illustrative method for securing physical-storage-media data transfers in accordance with one or more example embodiments.

FIG. 5 depicts an illustrative method for securing physical-storage-media data transfers in accordance with one or more example embodiments. Referring to FIG. 5, at step 502, physical storage media approved for use by an organization may be provisioned with physical-storage-media identifiers. For example, computing device(s) 306 may write a different physical-storage-media identifier to each of physical storage media 326. At step 504, a request to write secure data to a physical storage medium may be received. For example, computing system 314 may receive a request to write a portion of secure data 310 to a physical storage medium from computing device(s) 302 or 304. At step 506, a determination may be made whether to write the secure data to the physical storage medium. For example, computing system 314 may determine that computing device(s) 302 should write the requested portion of secure data 310 to the physical storage medium and/or that computing device(s) 304 should not write the requested portion of secure data 310 to the physical storage medium. Responsive to determining that the secure data should be written to the physical storage medium, at step 508, the secure data may be requested, and, at step 510, the secure data may be written to the physical storage medium. For example, responsive to determining that computing device(s) 302 should write the requested portion of secure data 310 to the physical storage medium, computing system 314 may request the portion of secure data 310 from computing device(s) 308 and communicate the portion of secure data 310 to computing device(s) 302, which may write the portion of secure data 310 to the physical storage medium. Similarly, responsive to determining that computing device(s) 304 should not write the requested portion of secure data 310 to the physical storage medium, computing system 314 may fail to request the portion of secure data 310 from computing device(s) 308. At step 512, a log may be updated to reflect whether the requested portion of the secure data was written to the physical storage medium. For example, computing system 314 may update the log to reflect that computing device(s) 302 wrote the requested portion of secure data 310 to the physical storage medium and/or that computing device(s) 304 failed to write the requested portion of secure data 310 to the physical storage medium.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   receiving, via a communication interface of a computing system comprising at least one processor, a memory, and the communication interface, a plurality of physical-storage-media identifiers stored on a plurality of physical storage media approved for use by an organization associated with the computing system;
   generating, by the at least one processor, for each physical storage medium of the plurality of physical storage media approved for use by the organization, and in a log stored in the memory, an entry comprising a physical-storage-media identifier, of the plurality of physical-storage-media identifiers, stored on the physical storage medium;
   receiving, by the computing system, via the communication interface, and from a first computing device, a request to write a first portion of secure data stored in the memory to a first physical storage medium;
   receiving, by the computing system, via the communication interface, and from a second computing device, a request to write a second portion of the secure data stored in the memory to a second physical storage medium;
   responsive to a determination by the at least one processor that the request to write the first portion of the secure data stored in the memory to the first physical storage medium comprises a first physical-storage-media identifier that is amongst the plurality of physical-storage-media identifiers:
      instructing, by the computing system and via the communication interface, the first computing device to write the first portion of the secure data stored in the memory to the first physical storage medium; and
      updating, by the at least one processor, an entry, of the log stored in the memory, comprising the first physical-storage-media identifier that is amongst the plurality of physical-storage-media identifiers to reflect that the computing system instructed the first computing device to write the first portion of the secure data stored in the memory to the first physical storage medium;
   responsive to a determination by the at least one processor that the request to write the second portion of the secure data stored in the memory to the second physical storage medium comprises a second physical-storage-media identifier that is amongst the plurality of physical-storage-media identifiers:
      failing, by the computing system, to instruct the second computing device to write the second portion of the secure data stored in the memory to the second physical storage medium; and
      updating, by the at least one processor, an entry, of the log stored in the memory, comprising the second physical-storage-media identifier that is amongst the plurality of physical-storage-media identifiers to reflect that the computing system failed to instruct the second computing device to write the second portion of the secure data stored in the memory to the second physical storage medium; and
   determining, by the at least one processor and based on the second physical-storage-media identifier that is amongst the plurality of physical-storage-media identifiers, that the second physical storage medium has been tampered with, and wherein failing to instruct the second computing device to write the second portion of the secure data stored in the memory to the second physical storage medium is performed responsive to determining that the second physical storage medium has been tampered with,
   wherein generating the entry comprising the physical-storage-media identifier comprises generating an entry comprising one or more properties of the physical storage medium, wherein receiving the request to write the second portion of the secure data stored in the memory to the second physical storage medium comprises receiving one or more properties of the second physical storage medium, and wherein determining that the second physical storage medium has been tampered with comprises:
      identifying, by the at least one processor and in the log stored in the memory, an entry comprising the second physical-storage-media identifier that is amongst the plurality of physical-storage-media identifiers; and
      determining, by the at least one processor, that the entry comprising the second physical-storage-media identifier that is amongst the plurality of physical-storage-media identifiers comprises one or more properties that are different from the one or more properties of the second physical storage medium.

2. The method of claim 1, wherein determining that the entry comprising the second physical-storage-media identifier that is amongst the plurality of physical-storage-media identifiers comprises one or more properties that are different from the one or more properties of the second physical storage medium comprises determining that the entry comprising the second physical-storage-media identifier that is amongst the plurality of physical-storage-media identifiers indicates that a physical storage medium, of the plurality of physical storage media approved for use by the organization, has been written to a different number of times than a number of times the one or more properties of the second physical storage medium indicate the second physical storage medium has been written to.

3. The method of claim 1, wherein determining that the entry comprising the second physical-storage-media identifier that is amongst the plurality of physical-storage-media identifiers comprises one or more properties that are different from the one or more properties of the second physical storage medium comprises determining that the entry comprising the second physical-storage-media identifier that is amongst the plurality of physical-storage-media identifiers indicates that a physical storage medium, of the plurality of physical storage media approved for use by the organization, has an available amount of storage that is different from an available amount of storage indicated by the one or more properties of the second physical storage medium.

4. The method of claim 1, wherein determining that the entry comprising the second physical-storage-media identifier that is amongst the plurality of physical-storage-media identifiers comprises one or more properties that are different from the one or more properties of the second physical storage medium comprises determining that the entry comprising the second physical-storage-media identifier that is amongst the plurality of physical-storage-media identifiers indicates that a physical storage medium, of the plurality of physical storage media approved for use by the organization, has a total storage capacity that is different from a total storage capacity indicated by the one or more properties of the second physical storage medium.

5. The method of claim 1, wherein determining that the entry comprising the second physical-storage-media identifier that is amongst the plurality of physical-storage-media identifiers comprises one or more properties that are different from the one or more properties of the second physical storage medium comprises determining that the entry comprising the second physical-storage-media identifier that is amongst the plurality of physical-storage-media identifiers indicates that a physical storage medium, of the plurality of physical storage media approved for use by the organization, has a different manufacture than a manufacture indicated by the one or more properties of the second physical storage medium.

6. The method of claim 1, wherein determining that the entry comprising the second physical-storage-media identifier that is amongst the plurality of physical-storage-media identifiers comprises one or more properties that are different from the one or more properties of the second physical storage medium comprises determining that the entry comprising the second physical-storage-media identifier that is amongst the plurality of physical-storage-media identifiers indicates that the second physical-storage-media identifier has been read from a physical storage medium, of the plurality of physical storage media approved for use by the organization, a different number of times than a number of times that the one or more properties of the second physical storage medium indicate that the second physical-storage-media identifier has been read from the second physical storage medium.

7. The method of claim 1, comprising responsive to the determination by the at least one processor that the request to write the second portion of the secure data stored in the memory to the second physical storage medium comprises the second physical-storage-media identifier that is amongst the plurality of physical-storage-media identifiers:
  generating, by the at least one processor and based on the entry comprising the second physical-storage-media identifier that is amongst the plurality of physical-storage-media identifiers, a message indicating that that the computing system failed to instruct the second computing device to write the second portion of the secure data stored in the memory to the second physical storage medium; and
  communicating, via the communication interface and to a computing device associated with a physical-storage-media administrator of the organization, the message indicating that that the computing system failed to instruct the second computing device to write the second portion of the secure data stored in the memory to the second physical storage medium.

8. A method comprising:
  receiving, via a communication interface of a computing system comprising at least one processor, a memory, and the communication interface, a plurality of physical-storage-media identifiers stored on a plurality of physical storage media approved for use by an organization associated with the computing system;
  generating, by the at least one processor, for each physical storage medium of the plurality of physical storage media approved for use by the organization, and in a log stored in the memory, an entry comprising a physical-storage-media identifier, of the plurality of physical-storage-media identifiers, stored on the physical storage medium;
  receiving, by the computing system, via the communication interface, and from a first computing device, a request to write a first portion of secure data stored in the memory to a first physical storage medium;
  receiving, by the computing system, via the communication interface, and from a second computing device, a request to write a second portion of the secure data stored in the memory to a second physical storage medium;
  responsive to a determination by the at least one processor that the request to write the first portion of the secure data stored in the memory to the first physical storage medium comprises a first physical-storage-media identifier that is amongst the plurality of physical-storage-media identifiers:
    instructing, by the computing system and via the communication interface, the first computing device to write the first portion of the secure data stored in the memory to the first physical storage medium; and
    updating, by the at least one processor, an entry, of the log stored in the memory, comprising the first physical-storage-media identifier that is amongst the plurality of physical-storage-media identifiers to reflect that the computing system instructed the first computing device to write the first portion of the secure data stored in the memory to the first physical storage medium;
  responsive to a determination by the at least one processor that the request to write the second portion of the secure data stored in the memory to the second physical storage medium comprises a second physical-storage-media identifier that is amongst the plurality of physical-storage-media identifiers:
    failing, by the computing system, to instruct the second computing device to write the second portion of the secure data stored in the memory to the second physical storage medium; and
    updating, by the at least one processor, an entry, of the log stored in the memory, comprising the second physical-storage-media identifier that is amongst the plurality of physical-storage-media identifiers to reflect that the computing system failed to instruct the second computing device to write the second portion of the secure data stored in the memory to the second physical storage medium; and writing, by the computing system and to each physical storage medium of the plurality of physical storage media approved for use by the organization, a different physical-storage-media identifier of the plurality of physical-storage-media identifiers, wherein the plurality of physical storage media approved for use by the organization comprises a plurality of optical media, and wherein writing the different physical-storage-media identifier of the plurality of physical-storage-media identifiers comprises writing, for each optical medium of the plurality of optical media, the different physical-storage-media identifier of the plurality of physical-storage-media identifiers to the optical medium, wherein writing the different physical-storage-media identifier of the plurality of physical-storage-media identifiers to the optical medium comprises:

writing, to a portion of the optical medium reserved for physical-storage-media identifiers associated with the plurality of physical storage media approved for use by the organization, the different physical-storage-media identifier of the plurality of physical-storage-media identifiers; and configuring the optical medium to prevent the portion of the optical medium reserved for physical-storage-media identifiers associated with the plurality of physical storage media approved for use by the organization from being displayed in a user-viewable portion of an operating system file system.

9. The method of claim 8, comprising responsive to the determination by the at least one processor that the request to write the second portion of the secure data stored in the memory to the second physical storage medium comprises the second physical-storage-media identifier that is amongst the plurality of physical-storage-media identifiers:

generating, by the at least one processor and based on the entry comprising the second physical-storage-media identifier that is amongst the plurality of physical-storage-media identifiers, a message indicating that that the computing system failed to instruct the second computing device to write the second portion of the secure data stored in the memory to the second physical storage medium; and communicating, via the communication interface and to a computing device associated with a physical-storage-media administrator of the organization, the message indicating that that the computing system failed to instruct the second computing device to write the second portion of the secure data stored in the memory to the second physical storage medium.

10. A method comprising:

receiving, via a communication interface of a computing system comprising at least one processor, a memory, and the communication interface, a plurality of physical-storage-media identifiers stored on a plurality of physical storage media approved for use by an organization associated with the computing system;

generating, by the at least one processor, for each physical storage medium of the plurality of physical storage media approved for use by the organization, and in a log stored in the memory, an entry comprising a physical-storage-media identifier, of the plurality of physical-storage-media identifiers, stored on the physical storage medium;

receiving, by the computing system, via the communication interface, and from a first computing device, a request to write a first portion of secure data stored in the memory to a first physical storage medium;

receiving, by the computing system, via the communication interface, and from a second computing device, a request to write a second portion of the secure data stored in the memory to a second physical storage medium;

responsive to a determination by the at least one processor that the request to write the first portion of the secure data stored in the memory to the first physical storage medium comprises a first physical-storage-media identifier that is amongst the plurality of physical-storage-media identifiers:

instructing, by the computing system and via the communication interface, the first computing device to write the first portion of the secure data stored in the memory to the first physical storage medium; and updating, by the at least one processor, an entry, of the log stored in the memory, comprising the first physical-storage-media identifier that is amongst the plurality of physical-storage-media identifiers to reflect that the computing system instructed the first computing device to write the first portion of the secure data stored in the memory to the first physical storage medium;

responsive to a determination by the at least one processor that the request to write the second portion of the secure data stored in the memory to the second physical storage medium comprises a second physical-storage-media identifier that is amongst the plurality of physical-storage-media identifiers:

failing, by the computing system, to instruct the second computing device to write the second portion of the secure data stored in the memory to the second physical storage medium; and updating, by the at least one processor, an entry, of the log stored in the memory, comprising the second physical-storage-media identifier that is amongst the plurality of physical-storage-media identifiers to reflect that the computing system failed to instruct the second computing device to write the second portion of the secure data stored in the memory to the second physical storage medium; and writing, by the computing system and to each physical storage medium of the plurality of physical storage media approved for use by the organization, a different physical-storage-media identifier of the plurality of physical-storage-media identifiers, wherein the plurality of physical storage media approved for use by the organization comprises a plurality of solid-state-memory devices, and wherein writing the different physical-storage-media identifier of the plurality of physical-storage-media identifiers comprises writing, for each solid-state-memory device of the plurality of solid-state-memory devices, the different physical-storage-media identifier of the plurality of physical-storage-media identifiers to the solid-state-memory device, wherein writing the different physical-storage-media identifier of the plurality of physical-storage-media identifiers to the solid-state-memory device comprises:

writing, to a portion of the solid-state-memory device reserved for physical-storage-media identifiers associated with the plurality of physical storage media approved for use by the organization, the different physical-storage-media identifier of the plurality of physical-storage-media identifiers; and configuring the solid-state-memory device to prevent the portion of the solid-state-memory device reserved for physical-storage-media identifiers associated with the plurality of physical storage media approved for use by the organization from being displayed in a user-viewable portion of an operating system file system.

11. The method of claim 10, comprising responsive to the determination by the at least one processor that the request to write the second portion of the secure data stored in the memory to the second physical storage medium comprises the second physical-storage-media identifier that is amongst the plurality of physical-storage-media identifiers:

generating, by the at least one processor and based on the entry comprising the second physical-storage-media identifier that is amongst the plurality of physical-storage-media identifiers, a message indicating that that the computing system failed to instruct the second computing device to write the second portion of the secure data stored in the memory to the second physical storage medium; and communicating, via the communication interface and to a computing device associated with a physical-storage-media administrator of the organization, the message indicating that that the computing system failed to instruct the second computing device to write the second portion of the secure data stored in the memory to the second physical storage medium.

* * * * *